US010093040B2

(12) United States Patent
Redl et al.

(10) Patent No.: US 10,093,040 B2
(45) Date of Patent: Oct. 9, 2018

(54) METHOD FOR PRODUCING AN ARTIFICIAL LEATHER WITH IMPROVED FLEXING ENDURANCE PROPERTIES

(75) Inventors: Franz Xaver Redl, Lemfoerde (DE); Andreas Emge, Shanghai (CN); YueXia Feng, Shanghai (CN); Cheun-Gwo Chen, New Taipei (TW); Xiao-Kun Yang, Guangzhou (CN); Oliver Reese, Mannheim (DE)

(73) Assignee: BASF SE, Ludwigshafen (DE)

( * ) Notice: Subject to any disclaimer, the term of this patent is extended or adjusted under 35 U.S.C. 154(b) by 1052 days.

(21) Appl. No.: 14/345,813

(22) PCT Filed: Sep. 10, 2012

(86) PCT No.: PCT/EP2012/067635
§ 371 (c)(1),
(2), (4) Date: Mar. 19, 2014

(87) PCT Pub. No.: WO2013/041397
PCT Pub. Date: Mar. 28, 2013

(65) Prior Publication Data
US 2014/0215850 A1    Aug. 7, 2014

(30) Foreign Application Priority Data
Sep. 21, 2011    (WO) ................ PCT/CN2011/079951

(51) Int. Cl.
| B29C 39/14 | (2006.01) |
| D06N 3/00 | (2006.01) |
| D06N 3/14 | (2006.01) |
| A43B 23/02 | (2006.01) |
| B32B 37/24 | (2006.01) |
| B32B 37/26 | (2006.01) |
| D06N 3/18 | (2006.01) |

(52) U.S. Cl.
CPC ........ *B29C 39/146* (2013.01); *A43B 23/0235* (2013.01); *B32B 37/24* (2013.01); *B32B 37/26* (2013.01); *D06N 3/0097* (2013.01); *D06N 3/14* (2013.01); *D06N 3/145* (2013.01); *D06N 3/183* (2013.01); *B32B 2037/243* (2013.01); *B32B 2037/268* (2013.01); *D06N 2211/106* (2013.01); *D06N 2211/28* (2013.01); *Y10T 428/24967* (2015.01)

(58) Field of Classification Search
None
See application file for complete search history.

(56) References Cited

U.S. PATENT DOCUMENTS

| 4,232,152 A | 11/1980 | Bechara et al. |
| 4,366,084 A | 12/1982 | Arbir et al. |
| 4,450,246 A | 5/1984 | Jachimowicz |
| 4,582,861 A | 4/1986 | Galla et al. |
| 4,617,286 A | 10/1986 | Arai et al. |
| 5,770,635 A | 6/1998 | Lee et al. |
| 6,525,107 B1 | 2/2003 | Wendel et al. |
| 2005/0100710 A1* | 5/2005 | Feng ................. B32B 27/12 428/151 |
| 2007/0111620 A1 | 5/2007 | Ono et al. |
| 2008/0090956 A1 | 4/2008 | Munzmay et al. |
| 2008/0214727 A1 | 9/2008 | Pohl et al. |
| 2010/0239846 A1 | 9/2010 | Tsubota |

FOREIGN PATENT DOCUMENTS

| CN | 101492886 | * | 7/2009 | |
| CN | 101824755 A | * | 9/2010 | ............. B32B 27/40 |
| DE | 195 12 480 A1 | | 10/1996 | |
| EP | 0 989 146 A1 | | 3/2000 | |
| EP | 1 143 063 A2 | | 10/2001 | |
| EP | 1 696 073 A1 | | 8/2006 | |
| EP | 1 861 251 | | 12/2007 | |
| EP | 1 905 789 A2 | | 4/2008 | |
| EP | 1 927 466 A1 | | 6/2008 | |
| EP | 2 476 800 A1 | | 7/2012 | |
| TW | I307375 | | 3/2009 | |
| WO | 2005/035795 | | 4/2005 | |
| WO | WO 2006/097508 A1 | | 9/2006 | |
| WO | WO 2009/112168 A1 | | 9/2009 | |

OTHER PUBLICATIONS

Machine translation of CN 101824755 A.*
Office Action dated May 4, 2017, in Taiwan Patent Application No. 101134549 filed Sep. 20, 2012 (w/ English Translation).
International Search Report dated Mar. 8, 2013 in PCT/EP2012/067635.

* cited by examiner

*Primary Examiner* — Edmund Lee
(74) *Attorney, Agent, or Firm* — Oblon, McClelland, Maier & Neustadt, L.L.P.

(57) ABSTRACT

The present invention relates to a process for production of artificial leather comprising top coat, polyurethane layer and optional substrate layer, said process comprising i) providing a release layer, ii) applying one or more than one layer of a top coat to the release layer to an overall top coat layer thickness in the range from 1 to 500 µm, iii) applying first polyurethane system components comprising an isocyanate component (A) and a polyol component (B) to the top coat to form a first polyurethane layer, wherein the isocyanate index of the first polyurethane system components is in the range from 101 to 140, iv) optionally applying further polyurethane system components to the first polyurethane layer to form further polyurethane layers, v) optionally applying a substrate layer to the polyurethane system components, vi) curing the polyurethane system components to form a polyurethane layer, and vii) separating the release layer from the top coat, wherein the overall thickness of the first and optionally further polyurethane layers is in the range from 0.01 to 20 mm and the polyurethane system components are solvent-free. The present invention further relates to an artificial leather obtainable by such a process and to the use of the artificial leather as upper materials for footwear.

16 Claims, No Drawings

METHOD FOR PRODUCING AN ARTIFICIAL LEATHER WITH IMPROVED FLEXING ENDURANCE PROPERTIES

The present invention relates to a process for production of artificial leather comprising top coat, polyurethane layer and optional substrate layer, said process comprising i) providing a release layer, ii) applying one or more than one layer of a top coat to the release layer to an overall top coat layer thickness in the range from 1 to 500 µm, iii) applying first polyurethane system components comprising an isocyanate component (A) and a polyol component (B) to the top coat to form a first polyurethane layer, wherein the isocyanate index of the first polyurethane system components is in the range from 101 to 140, iv) optionally applying further polyurethane system components to the first polyurethane layer to form further polyurethane layers, v) optionally applying a substrate layer to the polyurethane system components, vi) curing the polyurethane system components to form a polyurethane layer, and vii) separating the release layer from the top coat, wherein the overall thickness of the first and optionally further polyurethane layers is in the range from 0.01 to 20 mm and the polyurethane system components are solvent-free. The present invention further relates to an artificial leather obtainable by such a process and to the use of the artificial leather as upper materials for footwear, textiles and/or furniture.

The use of polyurethane resins for production of artificial leather is known in that for example EP 1143063 describes suitable resins. The prior art further typically employs two processes for production of artificial leather, namely the "dry process" and the "wet process". Polyurethane resins are typically used in the dry process and polyurethane suspensions in the wet process. What the two processes have in common is that they are technically inconvenient, inter alia because appreciable amounts of solvent have to be used to dissolve the polyurethane resins and the polyurethane suspension respectively. The wet process involves applying the polyurethane solution to a release paper, passing it through a coagulation bath and then curing it, while in the dry process the applied polyurethane solution is cured by evaporating the solvent.

What is disadvantageous about these processes is particularly the huge consumption of solvents, which damages the environment.

EP 1 861 251 describes a solventless process for production of artificial leather by applying an isocyanate component and a polyol component to a release layer and curing these polyurethane system components to form the polyurethane. Artificial leather according to EP 1861251 has outstanding mechanical properties and is simple to produce. Where an artificial leather as described in EP 1861251 is in need of improvement is with regard to its surface constitution, such as gloss, color and resistiveness.

The surface constitution of artificial leather is typically improved by using a top coat. More particularly, when the artificial leather is to be used as upper material for footwear, however, the mechanical and visual properties of the artificial leather have to meet very high requirements that exceed what is achievable solely through use of a top coat.

The problem addressed by the present invention was therefore that of providing an artificial leather which is obtainable in an environmentally friendly manner and which has very good mechanical properties, such as flexing endurance properties, while ensuring very good adherence of top coat and polyurethane.

This problem is solved by an artificial leather comprising top coat, polyurethane layer and optional substrate layer and obtainable by a process which comprises i) providing a release layer, ii) applying one or more than one layer of a top coat to the release layer to an overall top coat layer thickness in the range from 1 to 500 µm, iii) applying first polyurethane system components comprising an isocyanate component (A) and a polyol component (B) to the top coat to form a first polyurethane layer, wherein the isocyanate index of the further polyurethane system components is in the range from 101 to 140, iv) optionally applying further polyurethane system components to the first polyurethane layer to form further polyurethane layers, v) optionally applying a substrate layer to the polyurethane system components, vi) curing the polyurethane system components to form a polyurethane layer, and vii) separating the release layer from the top coat, wherein the overall thickness of the first and optionally further polyurethane layers is in the range from 0.01 to 20 mm, preferably in the range from 0.05 to 10 mm and more preferably in the range from 0.1 to 5 mm and the polyurethane system components are solvent-free.

The present invention further provides a process for production of artificial leather comprising top coat, polyurethane layer and optional substrate layer, said process comprising i) providing a release layer, ii) applying one or more than one layer of a top coat to the release layer to an overall top coat layer thickness in the range from 1 to 500 µm, iii) applying first polyurethane system components comprising an isocyanate component (A) and a polyol component (B) to the top coat to form a first polyurethane layer, wherein the isocyanate index of the first polyurethane system components is in the range from 101 to 140, iv) optionally applying further polyurethane system components to the first polyurethane layer to form further polyurethane layers, v) optionally applying a substrate layer to the polyurethane system components, vi) curing the polyurethane system components to form a polyurethane layer, and vii) separating the release layer from the top coat, wherein the overall thickness of the first and optionally further polyurethane layers is in the range from 0.01 to 20 mm and the polyurethane system components are solvent-free.

The process of the present invention comprises a release layer in step i). In principle, any layer is useful as release layer that allows polyurethane system components to be applied thereto and reacted to form polyurethane and the resulting polyurethane to be separated again from the release layer.

Release layer thickness is typically in the range from 0.001 millimeters (mm) to 10 mm, preferably in the range from 0.01 mm to 5 mm and more particularly in the range from 0.1 mm to 2 mm.

Suitable release layers are typically known in the pertinent art as "release paper". Examples of suitable release layers are layers, for example foils, of metal, plastic or paper.

In one preferred embodiment, the release layer used is a paper layer optionally coated with a plastic. Preferably, the paper layer here is coated with a polyolefin, preferably polypropylene. Alternatively, the paper layer is preferably coated with silicone.

In an alternative preferred embodiment, the release layer used is a PET layer (=polyethylene terephthalate) optionally coated with a plastic. Preferably, the PET layer here is coated with a polyolefin, preferably polypropylene. Alternatively, the PET layer is preferably coated with silicone.

Examples of suitable release layers are commercially available. Examples of renowned manufacturers in the pertinent art include Warren (Sappi, USA), Binda (Italy), Arjo Wiggins (UK/USA) and Lintec (Japan).

The release layers used may have a smooth or uneven surface. The type of release layer depends on the surface desired for the polymer layer resulting from the process of the present invention. When it is desired for a resulting polyurethane layer to have a smooth surface, the release layer will likewise have a smooth surface. When a resulting polyurethane layer is desired to have an uneven or patterned surface, the release layer will likewise have an uneven or patterned surface.

Preferably, the release layer is patterned such that the product has a leather grain.

Step ii) comprises applying a top coat to the release layer. The top coats used can be of the type typically used in the production of leather or leather imitations. These comprise polyurethane-based top coats, such as solventborne polyurethane coats or waterborne polyurethane dispersion coats, preferably waterborne polyurethane dispersion coats. Suitable coats may be based on a linear MDI-polyether-based polyurethane and be in a state of solution in DMF for example. Coats based on aliphatic isocyanates and polyesters or polyethers are likewise conceivable. These coats can be cured by addition of curatives, for example by addition of carbodiimide-based curative. The amount of curative added controls the hardness of the top coat obtained. The hardness of the top coat is preferably conformed to the hardness of the polyurethane layer. Preferably, the polyurethane coats comprise addition agents, such as dyes or pigments. Such polyurethane coats are described for example in EP1905789 and WO2009112168, which are incorporated herein by reference. Examples of waterborne polyurethane coats are Astacin® PR and Astacin® PW from BASF SE or Impranil® from Bayer Material Science. One coat layer can be applied or two or more coat layers can be applied on top of each other, in which case the starting materials for producing the respective coat layers can be the same or different. These coats are preferably applied by spraying the release layer or by knifecoating.

The overall thickness of the coat layers applied to the release layer is in the range from 1 to 500 µm, preferably in the range from 5 to 100 µm and more preferably in the range from 10 to 90 µm.

The coat layer is preferably dried, for example by allowing it to flash off or heating, before the polyurethane system components are applied. In the event that two or more layers of top coat are applied, it is particularly preferable to dry the applied layer before the subsequent layer of top coat is applied.

Application of the first polyurethane system components to produce the first polyurethane layer and also of the optional further polyurethane system components is preferably done uniformly, i.e., the polyurethane system components are applied such that the entire surface of the release layer is covered with polyurethane system components.

The polyurethane system components can generally be applied using any method whereby it is possible to apply a layer of polyurethane system components which are curable to a polyurethane layer of suitable thickness. The polyurethane system components are preferably applied by casting or spraying.

Casting typically refers to the application of the liquid material (polyurethane system components) by means of a mixing head. It is preferable to use commonly employed mixing heads operated under high or low pressure; for example, Puromats from Krauss Maffei or Hennecke are used as metering unit. The material is preferably applied in a laminar stream of material.

Preferably, the material applied is spread to a homogeneous layer thickness by blade coating with scrapers, for example spatulas. The material can further also be applied via wide-slit dies.

Spraying refers to application of the liquid material via a spray head. The spray head preferably atomizes the material into droplets and more particularly into fine droplets. A fan-shaped jet of spray is preferably formed in the process. It is preferable here for the polyurethane system components to be spray applied in the form of particles (which particles are preferably in the form of droplets, having a particle diameter in the range from 1 to 500 µm and more preferably in the range from 10 to 100 µm.

The polyurethane system components are typically applied in the process of the present invention in an amount such that the resulting polyurethane layer has a thickness in the range from 0.01 millimeters (mm) to 20 mm, preferably in the range from 0.05 mm to 10 mm and more preferably in the range from 0.1 mm to 5 mm. The overall thickness of the first polyurethane layer and of optional further polyurethane layers is less than 20 mm, preferably in the range from 0.05 to 10 mm and more preferably in the range from 0.1 mm to 5 mm. This does not include the thickness of the top coat even when the top coat is a polyurethane-based top coat.

The term polyurethane system components typically comprises an isocyanate component (A) and a polyol component (B).

The isocyanate component (A) comprises polyisocyanates (a). The polyisocyanates used comprise the customary aliphatic, cycloaliphatic and, more particularly, aromatic di- and/or polyisocyanates. Preference is given to using tolylene diisocyanate (TDI), diphenylmethane diisocyanate (MDI) and mixtures of diphenylmethane diisocyanate and polyphenylene polymethylene polyisocyanates (polymeric MDI), and especially diphenylmethane diisocyanate (monomeric MDI).

The isocyanates or else hereinbelow described isocyanate prepolymers may also be in a modified state, for example through incorporation of uretidione, carbamate, isocyanurate, carbodiimide or allophanate groups. It is further possible to use blends of the various isocyanates. Carbodiimide-modified isocyanates are preferably used. They are preferably used in an amount of 1% to 20% by weight and more preferably in an amount of 2% to 10% by weight, based on the overall weight of isocyanate component (A).

The polyisocyanates (a) can also be employed in the form of polyisocyanate prepolymers. These prepolymers are known in the prior art. They are prepared in a conventional manner by reacting above-described polyisocyanates (a) with hereinbelow described compounds having isocyanate-reactive hydrogen atoms (b) to form the prepolymer. The reaction may for example be carried out at temperatures of about 80° C. The polyol/polyisocyanate ratio is generally chosen such that the NCO content of the prepolymer is in the range from 6% to 25% by weight, preferably in the range from 8% to 24% by weight and more preferably in the range from 10% to 20% by weight.

A mixture comprising diphenylmethane diisocyanate and polytetrahydrofuran (PTHF), especially PTHF having a number average molecular weight in the range from 1000 to 2500, is used with particular preference as isocyanate component (A). The NCO content of this mixture is preferably in the range from 8% to 22% and more preferably in the range from 10% to 20%.

The polyisocyanate component (B) may in principle comprise compounds having isocyanate-reactive hydrogen atoms (b). These compound are such as bear two or more reactive groups selected from OH groups, SH groups, NH groups, $NH_2$ groups and carbon-acid groups, for example β-diketo groups, in the molecule. Depending on the choice of compounds having isocyanate-reactive hydrogen atoms (b), the term polyurethanes herein shall comprise polyisocyanate polyaddition products in general, including polyureas for example.

The polyol component (B) preferably comprises polyetherols and/or polyesterols. These are commonly known and described for example in "Kunststoffhandbuch Polyurethane" Günter Oertel, Carl-Hanser-Verlag, $2^{nd}$ edition 1983, chapter 3.1.1. Alternative designations likewise customary in the pertinent art are polyether polyols or polyether alcohols on the one hand and polyester polyols or polyester alcohols on the other.

When polyesterols are employed, these are typically obtained by condensation of polyfunctional alcohols having from 2 to 12 carbon atoms, preferably from 2 to 6 carbon atoms, with polyfunctional carboxylic acids having from 2 to 12 carbon atoms, examples being succinic acid, glutaric acid, adipic acid, suberic acid, azelaic acid, sebacic acid, decanedicarboxylic acid, maleic acid, fumaric acid and preferably phthalic acid, isophthalic acid, terephthalic acid and the isomeric naphthalenedicarboxylic acids.

When polyetherols are employed, these are generally obtained by known methods, for example by anionic polymerization using alkali metal hydroxides as catalysts and with addition of a starter molecule comprising multiple reactive hydrogen atoms in attachment, from one or more alkylene oxides selected from propylene oxide (PO) and ethylene oxide (EO), butylene oxide and tetrahydrofuran.

Useful polyetherols (b) further include so-called low-unsaturation polyetherols. Low-unsaturation polyols for the purposes of this invention are more particularly polyether alcohols comprising less than 0.02 meq/g and preferably less than 0.01 meq/g of unsaturated compounds. Polyether alcohols of this type are obtained via addition of ethylene oxide and/or propylene oxide and mixtures thereof onto at least difunctional alcohols in the presence of so-called double metal cyanide catalysts.

The alkylene oxides may be used individually, alternatingly in succession or as mixtures. The use of an EO-PO mixture leads to a polyether polyol having randomly distributed PO/EO units. It is possible to begin by using a PO-EO mixture and then, prior to termination of the polymerization, continue use of just PO or EO, the product then being a polyether polyol having a PO endcap or, respectively, an EO endcap.

Starter molecules used are typically NH- or OH-functional compounds such as water, amines or alcohols. Preference is given to using di- to hexahydric alcohols, such as ethanediol, 1,2-propanediol, 1,3-propanediol, diethylene glycol, dipropylene glycol, 1,4-butanediol, 1,6-hexanediol, glycerol, trimethylolpropane, pentaerythritol and/or sorbitol.

It is further preferable to use polyetherols obtained by ring-opening polymerization of tetrahydrofuran. These polytetrahydrofurans preferably have a functionality of about 2. They preferably further have a number average molecular weight in the range from 500 to 4000 g/mol, preferably in the range from 700 to 3000 g/mol and more preferably in the range from 900 to 2500 g/mol. Polytetrahydrofuran (=PTHF) is also known in the pertinent art under the designations tetramethylene glycol (=PTMG), polytetramethylene glycol ether (=PTMEG) or polytetramethylene oxides (=PTMO).

In addition to the abovementioned polyether polyols, the polyol component (B) may also comprise customary chain-extending agents, by which this invention understands compounds having 2 or more isocyanate-reactive hydrogen atoms and molecular weights in the range from 42 to less than 400 g/mol.

In one preferred embodiment, the polyol component (B) comprises one or more constituents selected from
(b-1) a polyol, preferably a polyether polyol, having a number-average molecular weight in the range from 500 g/mol to less than 3000 g/mol
(b-2) a polyol, preferably a polyether polyol, having a number-average molecular weight in the range from 3000 g/mol to 8000 g/mol
(b-3) a chain-extending agent having a molecular weight of less than 400 g/mol.

In one preferred embodiment, component (b-1) comprises a polyetherol or a polyesterol, more preferably a polyether polyol, having a number average molecular weight in the range from 500 to less than 3000 g/mol, preferably in the range from 800 to 2500 g/mol, and more preferably in the range from 1000 to 2200 g/mol as components (b1).

The components (b-1) typically have an average functionality of 1.8 to 3, more preferably of 1.9 to 2.1 and especially of 2.0. Functionality here refers to the "theoretical OH functionality" calculated from the functionality of the starter molecules used.

Polytetrahydrofuran is more preferably used as component (b-1). More particularly, polytetrahydrofuran having a number average molecular weight in the range from 1000 to 2000 g/mol is used.

The components (b-1) is typically present in component (B) in an amount from 30% to 100% by weight and preferably from 50% to 90% by weight, based on the overall weight of compounds having isocyanate-reactive hydrogen atoms (b).

In one preferred embodiment, components (b2) utilize a polyetherol or a polyesterol and more preferably a polyether polyol having a number average molecular weight in the range from 3000 to 8000 g/mol, preferably in the range from 3500 to 7000 g/mol and more preferably in the range from 4000 to 6000 g/mol as a compound having isocyanate-reactive hydrogen atoms (b).

The components (b-2) typically have an average functionality of 1.9 to 6, more preferably of 2.3 to 4 and especially of 3.0. Functionality here refers to the "theoretical OH functionality" calculated from the functionality of the starter molecules used.

Component (b-2) is more preferably a polyether polyol obtainable by propoxylation and/or ethoxylation of glycerol or trimethylolpropane, especially with an EO endblock. This polyether polyol preferably has a number average molecular weight in the range from 4500 to 6000 g/mol.

The component (b-2) is typically present in component (B) in an amount from 5% to 80% by weight and preferably from 10% to 30% by weight, based on the overall weight of compounds having isocyanate-reactive hydrogen atoms (b).

The polyol component (B) may further comprise chain-extending agents as component (b-3). Suitable chain-extending agents are compounds having two or more isocyanate-reactive hydrogen atoms and a molecular weight below 400 g/mol and are known in the prior art. Preference is given to using 2-functional alcohols having molecular weights below 400 g/mol and especially in the range from 60 to 150 g/mol. Examples are ethylene glycol, propylene glycol, diethylene glycol, 1,4-butanediol, dipropylene glycol, tripropylene glycol. 1,4-Butanediol is preferably used.

The chain-extending agent is typically used in an amount from 2% to 25% by weight, preferably from 3% to 13% by weight and more preferably from 3% to 20% by weight, based on the overall weight of compounds having isocyanate-reactive hydrogen atoms (b).

In one preferred embodiment, the reaction of the polyurethane system components (A) and (B) takes place in the absence of a blowing agent. The resulting polyurethane layer will then be a compact polyurethane. Compact polyurethane in the context of this invention refers to polyurethanes obtained without addition of blowing agents. The polyurethane layer resulting in this embodiment typically has a density in the range from 0.6 to 1.2 kg/liter and preferably in the range from 0.8 to 1.1 kg/liter.

As the case may be, the polyol component (b) used may for technical reasons comprise a small proportion of residual water. This will be particularly the case when no water trap is used as component (e). The residual water content is preferably below 0.5% by weight and more preferably below 0.2% by weight, based on the overall weight of component (B) used.

In an alternative embodiment, a blowing agent (c) may be added to the reaction of components (A) and (B). Adding the blowing agent preferably leads to an improvement in the breathability of the resulting polyurethane layer. The blowing agent (c) is preferably a constituent of polyol component (B).

Useful blowing agents include commonly known chemically or physically acting compounds. Physical blowing agents also include inert gases introduced into and/or dissolved in the starting components, examples being carbon dioxide, nitrogen or noble gases. Water may preferably be used as a chemically acting blowing agent. Examples of physical blowing agents are inert (cyclo)aliphatic hydrocarbons having from 4 to 8 carbon atoms and preferably having a boiling point of less than 60° C. Further examples are dialkyl ethers, esters, ketones, acetals, fluoroalkanes having from 1 to 8 carbon atoms. The physical blowing agents mentioned may be used singly or in any combinations between each other.

The amount in which the blowing agent is used is generally in the range from 0.05 to 10% and preferably in the range from 0.1 to 5%, based on the overall weight of components (b) to (f). The polyurethane layer which results in this embodiment typically has a density of 0.5 to 1.1 kg/liter and preferably of 0.7 to 0.9 kg/liter.

Preference is given to using environmentally benign blowing agents having a but minimal ozone depletion potential (ODP) and global warming potential (GWP), based on 20 years, and do not exceed the corresponding values of typical hydrocarbons. Preferred blowing agents have an ODP=0 and GWP<15.

In one preferred embodiment, the polyol component (B) comprises fillers (d). The customary fillers known in the field of polyurethane chemistry are suitable in general. Examples of suitable fillers are glass fibers, mineral fibers, natural fibers, such as flax, jute or sisal for example, glass flakes, silicates such as mica or glimmer, salts, such as calcium carbonate, chalk or gypsum.

It is preferable to use fillers which create cracks in the resulting polyurethane layer on its being subjected to orientation. These cracks generally lead to enhanced breathability. It is particularly preferable to use calcium carbonate as filler.

The fillers (d) are typically used in an amount from 0.5% to 60% by weight and preferably from 3% to 10% by weight, based on the overall weight of components (b) to W.

In one preferred embodiment, the polyol component (B) comprises water traps (e). The customary water traps known in the field of polyurethane chemistry are suitable in general. Examples of suitable water traps are zeolites, especially in the form of zeolite pastes (an example being Baylith® L Paste 3A).

Water traps (e) are typically used in an amount from 1% to 10% by weight and preferably from 3% to 8% by weight, based on the overall weight of component (B).

In one particularly preferred embodiment, the components (A) and (B) include from 40% to 70% by weight of polytetrahydrofuran, based on the overall weight of components (A) and (B). The polytetrahydrofuran here preferably has a molecular weight as described above.

In one preferred embodiment, the reaction of components (A) and (B) takes place in the presence of a catalyst (f). This is more preferably a constituent part of component (B). The customary and known polyurethane formation catalysts are optionally used as catalysts for producing the polyurethane foams of the present invention, examples being organotin compounds, such as tin diacetate, tin dioctoate, dibutyltin dilaurate, and/or strongly basic amines such as diazabicyclooctane, triethylamine, or preferably triethylenediamine or bis(N,N-dimethylaminoethyl)ether.

The constituent (f) is typically used in an amount from 0.01% to 5% by weight and preferably from 0.05% to 4% by weight, based on the overall weight of components (b) to (f).

It is advantageous to use thermally activatable catalysts when applying the polyurethane system components by casting in particular.

Thermally activatable catalysts ensure a long open time for applying the polyurethane system components and yet rapid curing at elevated temperature. Thermally activatable catalysts are known and comprise for example acid-blocked, for example carboxylic acid-blocked and especially formic acid-blocked amine catalysts, for example tertiary amine catalysts, N-acetylated amine catalysts. These are obtainable for example by reaction of acids with bases, in the presence or absence of a solvent. Such catalysts are known and are described for example in U.S. Pat. No. 4,582,861, U.S. Pat. No. 4,232,152, U.S. Pat. No. 4,366,084, U.S. Pat. No. 4,450,246, U.S. Pat. No. 4,617,286, DE19512480, EP0989146, U.S. Pat. No. 6,525,107, U.S. Pat. No. 5,770,635. In the case of acid-blocked catalysts, the acid component used is preferably carboxylic acids, particularly oleic acid, formic acid, acetic acid, ethylhexyl acid, phenol, ricinoleic acid, linoleic acid and/or p-toluenesulfonic acid. By way of amine catalysts to be blocked it is preferable to use triethylenediamine, dimethylamino-N-methylpiperazine, N,N-diphenyl-N-methylamine, bis(N,N-dimethylaminoethyl)ether, N,N-dimethylaminoethoxyethanol and/or DBU. These blocked catalysts are usually present in a solvent/dispersant. Glycols, such as propylene glycol, dipropylene glycol, ethylene glycol and/or diethylene glycol, are preferably suitable as solvent/dispersant.

In addition to the thermally activatable catalysts mentioned, organometallic catalysts, such as nickel acetylacetonate, dioctyltin diisooctylmercaptoacetate or dibutyltin diisooctylmercaptoacetate can also be used in casting. It is particularly preferable for catalyst (f) in casting to comprise blocked diazabicycloundecene (DBU).

The catalyst is preferably selected such that applying the polyurethane system components by casting achieves an open time of at least one minute, more preferably at least 10 minutes and more particularly at least 15 minutes at 23° C. and 50% relative humidity.

The reaction of components (A) and (B) optionally takes place in the presence of further auxiliary and/or addition agents known in the production of polyurethanes, examples being cell regulators, release agents, pigments, surface-active compounds and/or stabilizers against oxidative, thermal, hydrolytic or microbial degradation or aging. These are preferably likewise a constituent part of component (B).

The polyurethane layer here may be effected by applying a first layer of polyurethane system components and also optionally further layers of polyurethane system components. Preferably, only one layer of polyurethane system components is applied to the top coat.

When two or more layers of polyurethane system components are applied, the second and each further layer are preferably applied to the underlying layer of polyurethane system components. This underlying layer of polyurethane system components may already be cured to such an extent before applying a further layer that the underlying layer is no longer fluent; alternatively, however, it may also still be fluent. Preferably, the underlying polyurethane layer at the time of applying the next polyurethane layer is no longer fluent but only cured to such an extent that it will adhere to a wooden spatula when contacted therewith. The curing of polyurethane system components may for example be speeded by heating or by irradiation, for example with microwave radiation or infrared radiation.

The polyurethane system components for forming the first and any one of the respectively further polyurethane layers can be the same or different. For instance, the polyurethane system components for forming the first polyurethane layer may include no blowing agent (c), while the polyurethane system components for forming one of the subsequent polyurethane layers do comprise blowing agent (c). The polyurethane layers are preferably produced by utilizing the same isocyanates (a) and polyols (b) in each case. It is particularly preferable for the polyurethane system components for forming the first polyurethane layer to differ from those for forming the second polyurethane layer in the isocyanate index only.

The process of the present invention generally has components (A) and (B) being reacted in such amounts that the equivalence ratio of NCO groups to the sum total of reactive hydrogen atoms is in the range from 1:0.8 to 1:2 and preferably in the range from 1:0.9 to 1:1.5. A ratio of 1:1 here corresponds to an NCO index of 100. It is an essential feature of the present invention that the equivalence ratio of NCO groups to the sum total of reactive hydrogen atoms in the polyurethane system components for forming the polyurethane layer which is in direct contact with the top coat is in the range from 1:1.01 to 1:1.4, preferably in the range from 1:1.05 to 1:1.3 and more preferably in the range from 1:1.10 to 1:1.2, which corresponds to an isocyanate index in the range from 101 to 140, preferably in the range from 105 to 130 and more particularly in the range from 110 to 120.

In one preferred embodiment, the polyurethane system components comprise essentially no solvent. In other words, not only the components (a) and (b) but also the components (c), (d), (e) and (f) comprise essentially no solvent. "Essentially no solvent" is to be understood as meaning that, apart from possibly manufacture-based impurities, they comprise no solvent and that no solvent was added to the components. The solvent content is thus below 1% by weight, preferably below 0.1% by weight and more preferably below 0.01% by weight, based on the overall weight of components (a) to (f).

The term "solvent" is common knowledge in the pertinent art. Solvent for the purposes of the present invention is to be understood in the widest sense as comprehending organic and inorganic liquids capable of dissolving other solid materials in a physical way. The prerequisite for a material to be useful as a solvent is that neither the dissolving material nor the dissolved material undergoes chemical changes in the course of the process of dissolution. Thus, the dissolved component can be recovered by physical methods of separation, such as distillation, crystallization, sublimation, evaporation and/or adsorption for example.

In the context of this invention, the polyurethane system components comprise essentially no organic solvent. More particularly the polyurethane system components comprise essentially no ether or glycol ether (such as diethyl ether, dibutyl ether, anisole, dioxane, monomeric tetrahydrofuran), ketones (such as acetone, butanone, cyclohexanone), esters (such as ethyl acetate), nitrogen compounds (such as dimethylformamide, pyridine, N-methylpyrrolidone, acetonitrile), sulfur compounds (such as carbon sulfide, dimethyl sulfoxide, sulfolane), nitro compounds (such as nitrobenzene), (hydro)halocarbons (such as dichloromethane, chloroform, tetrachloromethane, trichloroethene, tetrachloroethene, 1,2-dichloroethane, chlorofluorocarbons), hydrocarbons, preferably with boiling point above 60° C. (such as octane, methylcyclohexane, decalin, benzene, toluene, xylene).

In the context of this invention, the polyurethane system components (A) and/or (B) may comprise plasticizers. The generally customary plasticizers known for polymers can be used in principle. Examples of suitable plasticizers are derivatives of phthalic acid, of cyclohexanedicarboxylic acid, alkylsulfonic esters of phenol, and also derivatives of citric acid.

The optional step (v) of the process according to the present invention comprises applying a substrate layer to the polyurethane system components. The substrate layer is preferably applied as long as the polyurethane system components are not fully cured, i.e., as long as there is still an ongoing reaction of isocyanate groups with OH groups.

In principle, the substrate layer can be any layer capable of forming an adhering bond with the resulting polyurethane layer.

Substrate layer thickness is typically in the range from 0.01 millimeters (mm) to 20 mm, preferably in the range from 0.1 mm to 10 mm and more particularly in the range from 0.3 mm to 5 mm.

Examples of suitable release layers are layers, for example foils, of metal, plastic, leather and/or textile materials.

Various kinds of substrate layers are possible for the process of the present invention, examples being:

A fabric substrate layer: In this case the substrate layer can consist of one or more, identical or different, firmly interconnected plies, for example of narrowly or widely meshed wovens, knits, braids, networks (net cloths).

Batt substrate layer: sheetlike structures composed of randomly disposed fibers (examples being felts and fibrous webs), which may preferably be bound together by a binder. Batt substrate layers are usually cellulosic or textile batts consolidated with water-insoluble impregnants.

Fibrous substrate layer: articles of manufacture composed of loose, randomly disposed fibers which are consolidated by plastics being used as a binder. They are obtained for example by adhering together leather fibers (preferably obtainable from leather waste, for example from vegetable-tanned leather) with 8-40% by weight of a binder.

Foil substrate layer: articles of manufacture comprising (preferably homogeneous) foils composed of metal or plastic, for example rubber, PVC, polyamides, interpolymers and the like. A foil substrate layer preferably comprises no incorporated fiber.

One preferred embodiment utilizes a leather layer as substrate layer. When a leather layer is used, the leather in question is preferably split leather.

When a textile layer is used, the following materials will be particularly suitable to produce the textile layer: cotton, linen, polyester, polyamide and/or polyurethane.

Applying the substrate layer is preferably done as long as the most recently applied polyurethane system components are still fluent or are already cured to such an extent that they are no longer fluent but adhere to a wooden spatula on contact therewith.

The substrate layer is applied to the polyurethane system components by bringing the former into contact with the latter and pressing. The contact pressure is preferably between 0.01 and 6 bar and more preferably between 0.05 and 5 bar. The pressing time is between 0.1 sec and 100 sec and preferably between 0.5 sec and 15 seconds (sec).

When the polyurethane system components of the most recently applied polyurethane layer are already in a cured state, the substrate layer can also be applied to the polyurethane layer with the aid of a customary adhesive. Examples of such preferably solvent-free adhesives are one-component polyurethane adhesives or two-component polyurethane adhesives.

Step (vi) of the process according to the present invention comprises curing the polyurethane system components to form the polyurethane layer. This curing may be hastened by temperature elevation, for example in an oven, or by irradiation, for example with microwave radiation or infrared radiation.

In one preferred embodiment, the curing is effected at temperatures in the range from 80 to 130° C.

The curing operation continues until the reaction of isocyanate groups with OH-functional groups is essentially complete. The duration of the curing operation is preferably in the range from 0.5 to 20 minutes, more preferably in the range from 1 to 10 minutes and more particularly in the range from 2 to 5 minutes.

If desired, the material may subsequently be further conditioned at 60-100° C. for up to 24 hours.

Step (vii) of the process according to the present invention comprises separating the release layer from the polyurethane layer. The separating may be effected by the customary methods known in the prior art. For example, the release layer is peeled off the polyurethane layer. This polyurethane layer is preferably in a fully cured state before the release layer is separated off.

The process of the present invention may be carried out as a continuous operation or as a batch operation. It is preferably carried out as a continuous operation.

Continuous in this context is to be understood as meaning that the release layer and, if used, the substrate layer are present in the form of bands which are continuously advanced and treated according to the process of the present invention. The bands are generally from 10 to 500 meters and preferably from 20 to 200 meters in length. The band speed is typically in the range from 5 to 15 m/min.

In one continuous process of the present invention, the release layer forms a quasi release band. The release layer is preferably unwound off a spindle at the start of the process, the release layer removed from the polyurethane layer in the process of the present invention may preferably be wound up again on a spindle. This wound-up release layer may be reused in the process of the present invention; that is, it is reusable. The wound-up release layer is preferably reused at least 2 to 5 times.

In one continuous process of the present invention, the substrate layer forms a quasi substrate band. The substrate layer is preferably unwound off a spindle at the start of the process.

This continuous process of the present invention provides artificial leather comprising top coat, polyurethane layer and optional substrate layer, as a process product which is likewise present in the form of a band. The product obtained is preferably wound up on a spindle.

When the process of production is continuous, the layer of a top coat can be applied by spraying, by blade coating or by a wide slot die. The polyurethane system may subsequently be applied by spraying or by blade coating. Any combination of these production variants is possible.

The present invention further provides an artificial leather obtainable by the process of the present invention.

In one preferred embodiment, the artificial leather of the present invention, which is obtainable in the process of the present invention, is oriented. "Oriented" in this context is to be understood as meaning that the polyurethane layer in the solid state is subjected to tension or pressure in one or two directions (=mono- or uniaxial and biaxial orientation respectively). This orientation leads to an enlargement of the dimensions by a factor of up to 10, preferably to an enlargement of the dimensions by up to a factor in the range from 1.1 to 5 and more preferably to an enlargement of the dimensions by up to a factor in the range from 1.2 to 2.

The orientation preferably leads to an improvement in the breathability of the artificial leather of the present invention. The breathability of this artificial leather is preferably in the range from 0.5 to 15 $mg/cm^2$ and more preferably in the range from 3.5 to 8.5 $mg/cm^2$, as measured to DIN EN ISO 14268.

The artificial leather of the present invention is useful for numerous applications. Examples include seat covers and interior trim for means of transport, suitcases, bags, upper material for footwear, outerwear and the like.

In a further preferred embodiment, the artificial leather of the present invention is used for coating of textiles. The present invention thus also provides for the use of an artificial leather according to the present invention for coating of textiles. The artificial leather of the present invention is further used for production of furniture.

The artificial leather of the present invention has outstanding mechanical properties, such as flexing endurance properties, tongue tear strength, stretch and an outstanding bond between the top coat and the polyurethane layer in particular. Therefore, the artificial leather of the present invention is particularly useful for applications making high demands on the mechanical properties of the artificial leather, for example the use as upper material for footwear.

The examples which follow illustrate the invention.

EXAMPLES

The following input materials were used:
Top coat 1: MDI-polyether-based, linear polyurethane in DMF
Top coat 2: waterborne polyurethane coat based on aliphatic isocyanate and polyether Isocyanate 1: Prepolymer based on monomeric MDI and polytetrahydrofuran with an OH number of 56 mgKOH/g
Polyol 1: Polytetrahydrofuran with an OH number of 56 mgKOH/g
Polyol 2: Polytetrahydrofuran with an OH number of 112 mgKOH/g
Polyol 3: Polyethylene oxide-co-ethylene oxide based on glycerol as starter molecule with an OH number of 28 mg KOH/g
Chain extender (CE): 1,4-butanediol
Catalyst 1 (Cat.1): Jeffcat DPA
Catalyst 2 (Cat.2): acid-blocked diazabicycloundecene in 10% by weight diethylene glycol
Defoamer: MSA antifoam
Foam stabilizer: Dabco DC193
Formulations used were as follow (in parts by weight):

|  | 0 | A | B | C | D |
|---|---|---|---|---|---|
| polyol 1 | 66 |  |  |  |  |
| polyol 2 |  | 66 | 64 | 66 | 67 |
| polyol 3 | 15 | 15 | 15 | 15 | 15 |
| CE | 15 | 15 | 15 | 15 | 15 |
| water |  |  | 1 | 1 |  |
| Cat 1 | 2 | 2 | 2 |  |  |
| Cat 2 |  |  |  | 0.2 | 0.2 |
| defoamer | 0.5 | 0.5 |  |  | 0.5 |
| stabilizer |  |  | 1 | 1 |  |
| black paste | 2 | 2 | 2 | 2 | 2 |
| isocyanate 1 | X | X | X | X | X |

The artificial leathers were produced as follows (batch process):

A Favini BHT Nara release paper from (please add) is hotplate heated to 70° C. surface temperature. A coat layer about 50 micrometers in thickness is applied using a commercially customary spray gun. The coat consists of 500 ml of Astacin® PR aqueous aliphatic PU dispersion mixed with 150 ml of water, 50 ml of Lepton® black NB color preparation from BASF and 30 ml of Astacin Härter CT carbodiimide-based curative from BASF. The curative was suspended in 100 ml of water for better solubility before being added to the mixture. After spraying, the coat layer is allowed to dry for about 3 minutes. Thereafter, an approximately 400 micrometers thick layer of polyurethane reactive system A, which was temperature controlled to 25° C., is applied using a robot-guided spray mix head. Shortly after the PU reactive system was spray applied, Baiksan 0.8 mm is applied as a textile substrate, under slight pressure, to the incompletely cured polyurethane. The polyurethane is subsequently cured directly on the hotplate at 70° C. for about 15 minutes. Thereafter, the final artificial leather can be peeled off the release paper.

Table 1 below shows the properties of the artificial leather obtained from formulation A in the batch process as a function of the isocyanate index:

TABLE 1

| Specimen | Index | Maximum release force to GB/T 1646-2007 in N/2.5 cm | Bally flex |
|---|---|---|---|
| 1 | 90 | 53 | <100 000 (failed) |
| 2 | 95 | 22 | <100 000 (failed) |
| 3 | 100 | 53 | <100 000 (failed) |
| 4 | 105 | 60 | >100 000 |
| 5 | 110 | 120 | >100 000 |

TABLE 1-continued

| Specimen | Index | Maximum release force to GB/T 1646-2007 in N/2.5 cm | Bally flex |
|---|---|---|---|
| 6 | 115 | 149 | >100 000 |
| 7 | 120 | 111 | >100 000 |

The table shows that it needs an isocyanate index of 105 or more to achieve more than 100 cycles in the ASTM D6182 Bally flex test, which is important for footwear upper material in particular. At the same time, the release force between coat layer and polyurethane layer increases significantly for these indices.

Ex. 2 (Continuous Process)

A release paper (Favini® BHT Nara) travels at a speed of 8 m/min across a continuous rig for artificial leather production. A commercially customary spray gun was used to apply to the release paper a coating layer about 50 micrometers in thickness. The coating consists of 500 ml of aqueous, aliphatic PU dispersion (BASF® Astacin PR) mixed with 150 ml of water, 50 ml of black color preparation (BASF Lepton® schwarz NB) and 30 ml of carbodiimide-based curative (BASF Astacin® Härter CT). The curative was suspended in 100 ml of water for better solubility before being added to the mixture. The coating layer dries in the oven into which the material is conveyed after application of the coating and delayed therein for about 3 minutes. Thereafter, an approximately 400 micrometers thick layer of polyurethane reactive system (based on MDI prepolymer and PTHF polyols, temperature controlled at 25° C.) is applied with a robot-guided spray mix head. The material is subsequently led through an oven temperature controlled to 100 degrees only to reemerge from it after about 90 seconds. Thereafter, a textile substrate (Baiksan® 0.8 mm Softlin S 100) is applied, under slight pressure, to the still incompletely cured PU. Subsequently the polyurethane is cured in the 3$^{rd}$ oven at 120 degrees and reemerges from the oven after 4 minutes. Thereafter, the final artificial leather can be peeled off the release paper.

The obtained product of the present invention satisfies typical requirements of upper materials for footwear with regard to flexing endurance, adherence between top coat layer and polyurethane mid-layer and adherence between polyurethane mid-layer and substrate layer.

We claim:
1. A process for producing an artificial leather comprising a top coat, a polyurethane layer and an substrate layer, the process comprising, in the following order:
   applying at least one layer of a top coat to a release layer to produce an overall top coat layer thickness in the range from 1 to 500 µm;
   applying a first polyurethane system comprising an isocyanate component (A) and a polyol component (B) to the top coat to form a first polyurethane layer, such that an isocyanate index of the first polyurethane system is in the range from 101 to 140;
   optionally applying a further polyurethane system to the first polyurethane layer to form at least one further polyurethane layer;
   applying a substrate layer to the first polyurethane layer or to the further polyurethane layers;

curing the first polyurethane system and optionally the further polyurethane system to form a second polyurethane layer; and then, separating the release layer from the top coat, to form an artificial leather, wherein the overall thickness of the first and optionally further polyurethane layers is in the range from 0.01 to 20 mm and the first polyurethane system and the further polyurethane system are solvent-free.

2. The process according to claim 1, which is a continuous process.

3. The process according to claim 1, wherein the top coat is formed from an aqueous polyurethane dispersion.

4. The process according to claim 1, wherein the overall thickness of the first and optionally further polyurethane layers is in the range from 0.1 to 10 millimeters.

5. The process according to claim 1, wherein at least one layer of the first polyurethane system and/or the further polyurethane system comprises a blowing agent.

6. The process according to claim 1, wherein at least one layer of first polyurethane system and/or the further polyurethane system comprises a filler.

7. The process according to claim 1, wherein the isocyanate component (A) is a polyisocyanate prepolymer formed by reaction of 4,4'-MDI with a polytetrahydrofuran.

8. The process according to claim 1, wherein the polyol component (B) comprises a polytetrahydrofuran.

9. The process according to claim 8, wherein the polyol component (B) comprises the polytetrahydrofuran and 1,4-butanediol.

10. The process according to claim 8, wherein the at least one of the isocyanate component (A) and the polyol component (B) comprises from 40% to 70% by weight of a polytetrahydrofuran, based on the overall weight of components (A) and (B).

11. The process according to claim 1, wherein at least one of the isocyanate component (A) and the polyol component (B) comprises a plasticizer.

12. The process according to claim 1, wherein the applying of the first polyurethane system and optionally the further polyurethane systems occurs by blade coating.

13. The process according to claim 12, wherein a thermally activatable catalyst is present during the applying.

14. The process according to claim 1, wherein the applying of the first polyurethane system and optionally the further polyurethane systems occurs by spraying.

15. The process according to claim 1, wherein the first polyurethane system comprising an isocyanate component (A) and a polyol component (B) is applies directly to the top coat to form the first polyurethane layer, and wherein the isocyanate index of the first polyurethane system is in the range from 110 to 140.

16. The process according to claim 15, wherein the isocyanate index of the first polyurethane system is in the range from 115 to 140.

* * * * *

UNITED STATES PATENT AND TRADEMARK OFFICE
CERTIFICATE OF CORRECTION

PATENT NO. : 10,093,040 B2
APPLICATION NO. : 14/345813
DATED : October 9, 2018
INVENTOR(S) : Franz Xaver Redl et al.

Page 1 of 1

It is certified that error appears in the above-identified patent and that said Letters Patent is hereby corrected as shown below:

In the Specification

In Column 8, Line 6, delete "W." and insert -- (f). --, therefor.

In the Claims

In Column 14, Line 53, Claim 1, delete "an" and insert -- a --, therefor.

Signed and Sealed this
Twenty-eighth Day of April, 2020

Andrei Iancu
*Director of the United States Patent and Trademark Office*